United States Patent
Mayer et al.

(10) Patent No.: US 10,539,230 B2
(45) Date of Patent: Jan. 21, 2020

(54) METHOD FOR CONTROLLING AN HYDRAULICALLY ACTUATED SHIFTING ELEMENT OF A VEHICLE TRANSMISSION

(71) Applicant: ZF Friedrichshafen AG, Friedrichshafen (DE)

(72) Inventors: Florian Mayer, Wangen (DE); Frank Deprez, Mariabrunn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 79 days.

(21) Appl. No.: 15/770,872

(22) PCT Filed: Oct. 4, 2016

(86) PCT No.: PCT/EP2016/073612
§ 371 (c)(1),
(2) Date: Apr. 25, 2018

(87) PCT Pub. No.: WO2017/071914
PCT Pub. Date: May 4, 2017

(65) Prior Publication Data
US 2018/0306316 A1   Oct. 25, 2018

(30) Foreign Application Priority Data
Oct. 28, 2015   (DE) .................. 10 2015 221 021

(51) Int. Cl.
| *F16H 61/06* | (2006.01) |
| *F16D 25/12* | (2006.01) |
| *F16H 61/00* | (2006.01) |

(52) U.S. Cl.
CPC ......... *F16H 61/061* (2013.01); *F16D 25/123* (2013.01); *B60Y 2400/416* (2013.01);
(Continued)

(58) Field of Classification Search
CPC ............ B60Y 2400/416; F16H 61/061; F16H 2061/062; F16H 2061/0087; F16D 25/123;
(Continued)

(56) References Cited

U.S. PATENT DOCUMENTS 4,706,789 A * 11/1987 McColl ............... F16D 25/0635
192/106 F
4,742,461 A   5/1988 Eschrich et al.
(Continued)

FOREIGN PATENT DOCUMENTS

| DE | 3436190 A1 | 4/1986 |
| DE | 102007010942 A1 | 9/2008 |
(Continued)

OTHER PUBLICATIONS

German Search Report DE102015221021.9 dated Jul. 1, 2016. (8 pages).
(Continued)

*Primary Examiner* — Leslie A Nicholson, III
(74) *Attorney, Agent, or Firm* — Dority & Manning, P.A.

(57) ABSTRACT

A method for controlling a hydraulically actuated shift element of a vehicle transmission (G) includes determining a fill level of a pressure compensating cavity (2) associated with a pressure chamber (1) and controlling pressurizing of the pressure chamber (1) with hydraulic fluid based at least in part on the determined fill level of the pressure compensating cavity (2). The pressure chamber (1) is fillable with the hydraulic fluid by an electronically controlled hydraulic system in order to actuate the shift element.

15 Claims, 4 Drawing Sheets

(52) U.S. Cl.
CPC ............... *F16D 2500/1024* (2013.01); *F16D 2500/1045* (2013.01); *F16D 2500/3024* (2013.01); *F16H 2061/0087* (2013.01); *F16H 2061/062* (2013.01)

(58) Field of Classification Search
CPC ..... F16D 2500/1024; F16D 2500/1045; F16D 2500/3024
USPC ........................................................ 475/116
See application file for complete search history.

(56) References Cited

U.S. PATENT DOCUMENTS

| | | | | |
|---|---|---|---|---|
| 4,766,988 | A * | 8/1988 | Seibert | F16D 48/066 180/197 |
| 5,434,779 | A | 7/1995 | Vukovich et al. | |
| 6,464,059 | B1 * | 10/2002 | Kundermann | F16D 21/06 192/106 F |
| 7,798,300 | B2 * | 9/2010 | Combes | F16D 25/123 192/113.34 |
| 8,449,422 | B2 * | 5/2013 | Roegner | F16D 25/0638 475/116 |
| 8,813,935 | B2 * | 8/2014 | Hart | B60K 6/387 180/65.25 |
| 9,803,705 | B2 * | 10/2017 | Heubner | F16D 25/12 |
| 2001/0003322 | A1 | 6/2001 | Kon et al. | |
| 2004/0231443 | A1 * | 11/2004 | Vornehm | F16D 48/066 74/335 |
| 2008/0217134 | A1 * | 9/2008 | Popp | F16H 61/061 192/85.01 |
| 2011/0183811 | A1 | 7/2011 | Wilke et al. | |

FOREIGN PATENT DOCUMENTS

| | | |
|---|---|---|
| DE | 102014008157 A1 | 12/2014 |
| DE | 102013219326 A1 | 3/2015 |
| DE | 102014105160 A1 | 10/2015 |
| EP | 1106874 A2 | 6/2001 |
| EP | 1503101 A1 | 2/2005 |

OTHER PUBLICATIONS

International Search Report (English Translation) PCT/EP2016/073612, dated Dec. 12, 2016. (3 pages).

* cited by examiner

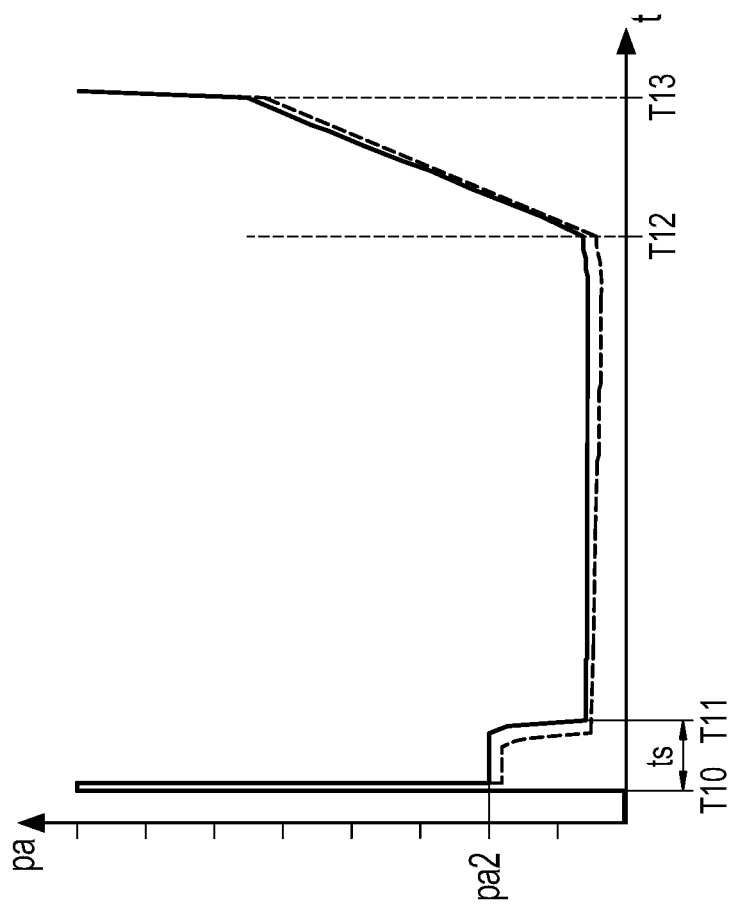

METHOD FOR CONTROLLING AN HYDRAULICALLY ACTUATED SHIFTING ELEMENT OF A VEHICLE TRANSMISSION

FIELD OF THE INVENTION

The invention relates generally to a method for controlling a hydraulically actuated shift element of a vehicle transmission, and to a vehicle transmission with an appropriate control.

BACKGROUND

Unexamined patent application DE 34 36 190 A1 describes a method for the electronic control of an automatic vehicle transmission, wherein electrohydraulically actuatable friction elements bring about the shifting between the various transmission ratio steps. A variable characterizing the gear shift, for example the slip time, the shift time, or the speed gradient during the slip time, is compared with a reference variable, wherein a correction value is stored if a predefined deviation is exceeded. This correction value acts in a correcting manner for subsequent gear shifts. In this way, manufacturing related deviations or aging effects are to be compensated for.

Patent U.S. Pat. No. 5,434,779 A describes a pressure control for an automatic transmission, wherein a characteristic map including correction values is used in order to correct the characteristic map values of the normal pressure control. In this case, the correction characteristic map relates to the gear shift type and the accelerator pedal position of the motor vehicle equipped with the automatic transmission. As a result, the ease of gear changes can be improved for various load conditions of the motor vehicle.

During a hydraulic actuation of a shift element, the force acting on the shift element depends on the pressure in the pressure chamber, which acts on the corresponding actuating piston. If this pressure chamber is being rotated, the pressure prevailing therein depends not only on values predefined by the control, but also on the rotational speed of the pressure chamber. If the rotational speed of the pressure chamber increases, the pressure in the pressure chamber increases due to the centrifugal forces acting on the hydraulic fluid. This rotational pressure can be compensated for by providing a pressure compensating cavity. Such a pressure compensating cavity is filled with hydraulic fluid and rotates at the same rotational speed as the pressure chamber. Due to a suitable design of the effective diameter of the pressure compensating cavity, the influence of the centrifugal forces on the pressure in the pressure chamber is compensated for, in that the pressure change of the hydraulic fluid in the pressure compensating cavity counteracts the pressure change in the pressure chamber. As a result, the rotational speed dependence of the force acting on the shift element can be clearly reduced. Such a design is known from patent application DE 10 2013 219 326 A1, by way of example.

Such a pressure compensating cavity is usually filled by the hydraulic system of the transmission. If the pressure supply of the hydraulic system is stopped, the pressure compensating cavity can drain. If the pressure supply of the hydraulic system is activated again, the pressure compensating cavity is filled again. In transmissions for hybrid vehicles or for motor vehicles having a start/stop function of the internal combustion engine, such a changeover between an inactive and an active pressure supply can take place over a very short time. Proceeding from the inactive state, if a pressure chamber for actuating a shift element is to be filled for a short time, a faulty pressure control may occur if the pressure compensating cavity is not yet filled or is filled with only a small amount of hydraulic fluid. This influences the quality of the gear shift in a negative way.

SUMMARY OF THE INVENTION

As used herein, a vehicle transmission means, in particular, a multi-stage transmission, in which a multitude of gears, i.e., fixed transmission ratios between two shafts of the transmission, are preferably automatically shiftable by shift elements. The shift elements are clutches or brakes, for example. Such transmissions are utilized primarily in motor vehicles in order to adapt the rotational speed and torque output characteristic of the drive unit to the driving resistances of the vehicle in a suitable way.

The invention provides a method for controlling a hydraulically actuated shift element of a vehicle transmission, which ensures an engagement of the shift element without sacrificing comfort, even in the case of a short-term activation of the pressure supply.

The method relates to the control of a hydraulically actuated shift element of a vehicle transmission, wherein a pressure chamber is filled with hydraulic fluid by an electronically controlled hydraulic system in order to actuate the shift element. According to the invention, the fill level of a pressure compensating cavity associated with the pressure chamber enters into the control of the shift element. By taking the fill level of the pressure compensating cavity into account, a comfortable, jerk-free engagement process of the shift element is possible even when the pressure compensating cavity is empty or partially empty.

Preferably, the rotational speed of a pressure supply unit of the hydraulic system is taken into account in the determination of the fill level. The pressure supply of the hydraulic system usually takes place with the aid of a pump which is driven by an input shaft of the vehicle transmission or by a separate electric pump drive. If necessary, the vehicle transmission can also include two pressure supply units, for example a primary pump driven by the input shaft and an electrically driveable secondary pump. In such systems, the rotational speed of both pumps can be taken into account. Taking the rotational speed or the rotational speeds into account allows for a more precise mapping of the filling process of the pressure compensating cavity.

Preferably, a rotational speed of the pressure compensating cavity is taken into account in the determination of the fill level. The rotational speed at which a hydraulic fluid present in the pressure compensating cavity remains in the pressure compensating cavity, and the rotational speed at which the pressure compensating cavity drains due to gravity can be determined in empirical tests. These limit speeds can be appropriately taken into account during the control. A speed sensor, which is usually present in the vehicle transmission, can be used for this purpose, optionally with consideration for a transmission ratio.

If the rotational speed of the pressure compensating cavity falls below the limit speed, the hydraulic fluid contained therein does not immediately flow out. Instead, due to the inertia of the hydraulic fluid, it can take a few seconds before the hydraulic fluid actually begins to flow out. The outflow process itself does not take place abruptly either. Instead, the outflow process continues until the pressure compensating cavity has emptied. Therefore, an interval which has passed since a rotational speed limit of the pressure compensating cavity rotational speed has been fallen below is preferably taken into account in the determination of the fill level. As a result, the accuracy of the fill level determination can be further improved.

According to one preferred embodiment, a temperature of the hydraulic fluid is taken into account in the determination of the fill level. The temperature can be determined, for example, by a temperature sensor in the sump of the hydraulic system. Due to the temperature-dependent viscosity of the hydraulic fluid, both the filling as well as the emptying of the pressure compensating cavity can take place at different rates at different temperatures. Taking the temperature into account therefore improves the accuracy of the fill level determination.

Preferably, a system pressure existing in the hydraulic system of the vehicle transmission is taken into account in the determination of the fill level. A refilling of the pressure compensating cavity takes place at different rates depending on the system pressure. Taking the system pressure into account therefore improves the accuracy of the fill level determination. Vehicle transmissions also frequently include multiple-circuit hydraulic systems which are supplied with hydraulic fluid by the pressure supply with varying priority. The pressure chambers of the shift elements are usually supplied with highest priority and, therefore, are arranged in the so-called primary circuit of the hydraulic system. The supply of the transmission lubrication is associated, for example, with the so-called secondary circuit of the hydraulic system and, therefore, is supplied with hydraulic fluid with second priority. A valve distributes the available flow to the different circuits of the hydraulic system depending on the system pressure. If the filling of the pressure chamber and the pressure compensating cavity takes place by way of differently prioritized circuits of the hydraulic system, a filling of the pressure compensating cavity can take longer at a low system pressure, in particular, than is the case at a high system pressure. This dependence can also be taken into account in the determination of the fill level.

According to one preferred embodiment, a leakage in the hydraulic system is taken into account in the determination of the fill level. Modern shift element controls in motor vehicle transmissions include a leakage model which describes the leakage depending on various operating parameters, such as temperature and/or system pressure. The accuracy of the fill level determination can be further improved by taking this model into account.

Preferably, a flow rate of active consumers of the hydraulic system is taken into account in the determination of the fill level. At the least, the consumers that are arranged in the same hydraulic circuit as the filling of the pressure compensating cavity, i.e., the consumers of the secondary circuit, for example, are taken into account. For example, an activatable cooling fluid flow can be provided in the secondary circuit in order to implement a cooling, according to demand, of a friction clutch or an electric motor or machine, for example. If the cooling fluid flow is activated, the flow rate available for filling the compensating cavity is reduced. The accuracy of the fill level determination can be further improved by taking such a consumer flow rate into account.

Preferably, the fill level determination of the pressure compensating cavity takes place by a fill level model. The fill level model indicates a fill level of the pressure compensating cavity depending on at least one of the parameters described at the outset. Preferably, several of the parameters described at the outset are taken into account in the fill level model; particularly preferably, all parameters described at the outset are taken into account. The output of the fill level by the fill level model can take place in various ways. For example, an indication of the fill level in percent is possible. Alternatively thereto, an indication of the fill level in a suitable unit of volume, for example, milliliters, is conceivable. The fill level can also be specified as a range, for example, "completely filled", "partially filled", or "empty". Based on the output of the fill level by way of the fill level model, the shift element control can form offset values for the control of the shift element. Such a model formation can take place in advance by way of empirical tests and/or calculations, and can be stored in a memory. In the vehicle transmission, the fill level can therefore be determined by entering existing sensor signals and operating states into the fill level model, and can be supplied to the shift element control.

Preferably, at least one of the following control parameters of the shift element is changed as a function of the fill level of the pressure compensating cavity: actuating pressure, specified filling pressure, filling time. The actuating pressure is the pressure that a valve of the hydraulic system releases to the pressure chamber. The specified filling pressure is a specified value of the actuating pressure, with which the valve of the hydraulic system is controlled for the initial filling of the pressure chamber. The filling time is the time during which the valve is actuated with the specified filling pressure.

If the pressure compensating cavity is insufficiently filled, the actuating pressure can be reduced. If the pressure compensating cavity is insufficiently filled, then the pressure increase in the pressure chamber induced by the centrifugal force cannot or cannot completely be compensated for. By way of an appropriate reduction of the actuating pressure, the centrifugal force pressure increase contributes to the correct actuating pressure. Therefore, a jerk-free engagement process of the shift element can be achieved even when the pressure compensating cavity is empty or partially empty.

If the pressure compensating cavity is insufficiently filled, the specified filling pressure of the shift element can be reduced. The specified filling pressure is used for the initial filling of the pressure chamber without the shift element being engaged. At the end of the filling phase, the pressure chamber should be filled and the air gap of the shift element should have been overcome, and therefore the engagement process of the shift element can subsequently begin. During the filling phase, the shift element should effect no significant torque transmission. If the pressure compensating cavity is insufficient filled in the filling phase, the pressure increase in the pressure chamber induced by the centrifugal force cannot or cannot completely be compensated for. By way of an appropriate reduction of the filling pressure, the centrifugal force pressure increase contributes to the correct filling pressure. Therefore, an undesirably early torque transmission of the shift element can also be avoided when the pressure compensating cavity is empty or has been partially drained.

If the pressure compensating cavity is insufficiently filled, the filling time can be reduced. As a result, an undesirably early torque transmission of the shift element can also be avoided when the pressure compensating cavity is empty or partially empty.

Preferably, the shift element is designed as a clutch, wherein the clutch connects an external interface of the vehicle transmission to an input shaft of a gear-forming section of the vehicle transmission. A transmission-external drive unit can be connected to the external interface. The shift element therefore does not contribute to the gear formation of the vehicle transmission, but rather acts as a separating clutch or as a master clutch. In particular, vehicle transmissions including an integrated electric motor or machine include this type of separating clutch, wherein the electric machine can be connected to the input shaft. When the transmission is utilized in the motor vehicle, the motor vehicle can be driven solely by the electric machine of the transmission. A transmission-external drive unit, which is connected to the external interface, can be decoupled from the input shaft by the separating clutch. Therefore, this drive unit need not be entrained in the electric mode. The transmission-external drive unit, which is designed as an internal combustion engine, for example, can be started by engaging the separating clutch. If an acceleration of the input shaft by the electric machine for starting the motor vehicle and an engagement of the separating clutch for starting the internal combustion engine take place proceeding from the standstill state of the input shaft and the transmission-external drive unit, the pressure compensating cavity of the separating clutch can be empty or partially drained due to the preceding standstill. If the fill level of the pressure compensating cavity were not taken into account, according to the invention, the clutch would transmit too much torque. This can bring about a drop in the vehicle acceleration or even a negative vehicle acceleration. The method according to the invention is therefore particularly advantageous for this type of application.

The method according to the invention can also be applied, of course, to the control of other transmission shift elements, for example to gear-forming shift elements.

The invention also relates to a vehicle transmission including a plurality of shift elements, a hydraulic system for actuating at least one of the shift elements, and an electronic control unit for controlling the hydraulic system. In this case, the control unit is configured for implementing the method according to the invention. The control unit includes multiple signal inputs, via which the control unit can receive signals from sensors of the transmission, for example rotational speed signals, status information regarding the hydraulic system, or a temperature of the hydraulic fluid. The control unit can have a communication connection to further, transmission-external control units and, in this way, can receive further signals. The control unit is configured for processing the signals and for influencing the operation of the hydraulic system in a suitable way.

BRIEF DESCRIPTION OF THE DRAWINGS

One exemplary embodiment of the invention is described in detail in the following with reference to the attached figures. Wherein:

FIG. 3 and FIG. 4 schematically show time sequences of various variables and parameters of the motor vehicle transmission.

DETAILED DESCRIPTION

Figure 1:
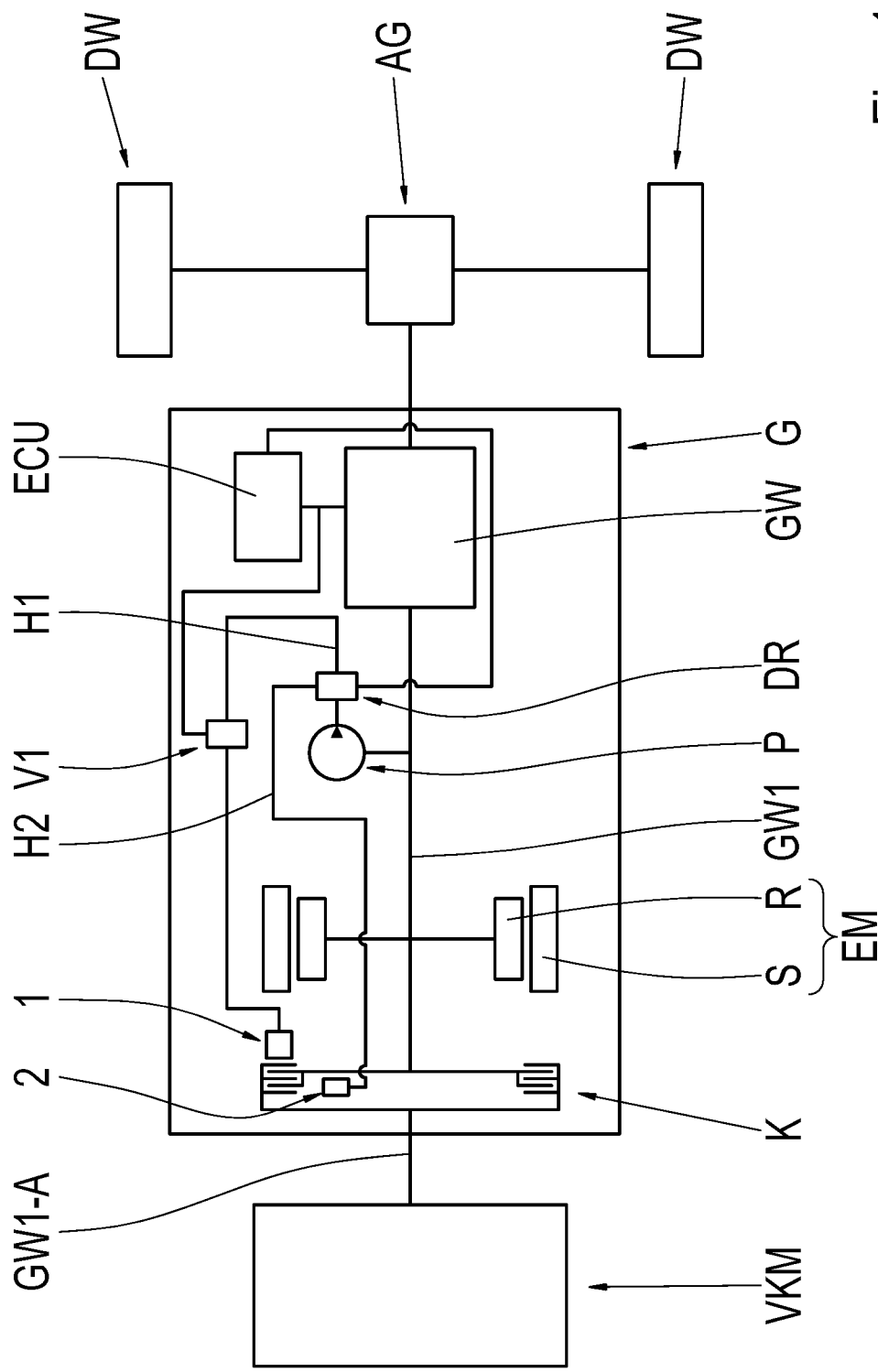
FIG. 1 shows a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drive train of a motor vehicle. An internal combustion engine VKM can be connected, via a clutch K, to a rotor R of an electric motor or machine EM. The electric machine EM, which includes not only the rotor R but also a rotationally fixed stator S, and the clutch K are part of a motor vehicle transmission G. The connection of the internal combustion engine VKM to the motor vehicle transmission G takes place at an external interface GW1-A of the motor vehicle transmission G. A pressure chamber 1 is associated with the clutch K. By pressurizing the pressure chamber 1, the clutch K can be engaged, and therefore the clutch can transmit torque. The motor vehicle transmission G includes a gearshift unit GW which is configured for making various transmission ratios available between an input shaft GW1 and an output shaft of the motor vehicle transmission G. The output shaft of the motor vehicle transmission G is drivingly connected to an axle transmission AG, via which the power of the output shaft is distributed to wheels DW of the motor vehicle. The motor vehicle transmission G requires a hydraulic pressure in order to make its functions available. To this end, the motor vehicle transmission G includes a pump P which is driven by the input shaft GW1 of the motor vehicle transmission G and downstream of which a system pressure valve DR is installed. The system pressure valve DR divides the flow generated by the pump P into a primary circuit H1 and into a secondary circuit H2. Associated with the primary circuit H1 are various control valves, including a control valve V1 for adjusting the pressure in the pressure chamber 1 for engaging the clutch K. The remaining valves (not shown) of the primary circuit H1 are utilized, for example, for engaging further shift elements which are associated with the gearshift unit GW. Associated with the secondary circuit H2 is the lubrication of the vehicle transmission G, as well as the supply of a pressure compensating cavity 2. The pressure compensating cavity 2 is associated with the clutch K. The motor vehicle transmission G further includes a control unit ECU which is configured for receiving various signals and for outputting control commands. In any case, the control unit ECU can control the control valve V1 in order to influence a pressure transmission from the primary circuit H1 to the pressure chamber 1 of the clutch K. The control unit ECU can also control the system pressure valve DR in order to adjust a desired system pressure in the primary circuit H1.

Figure 2:
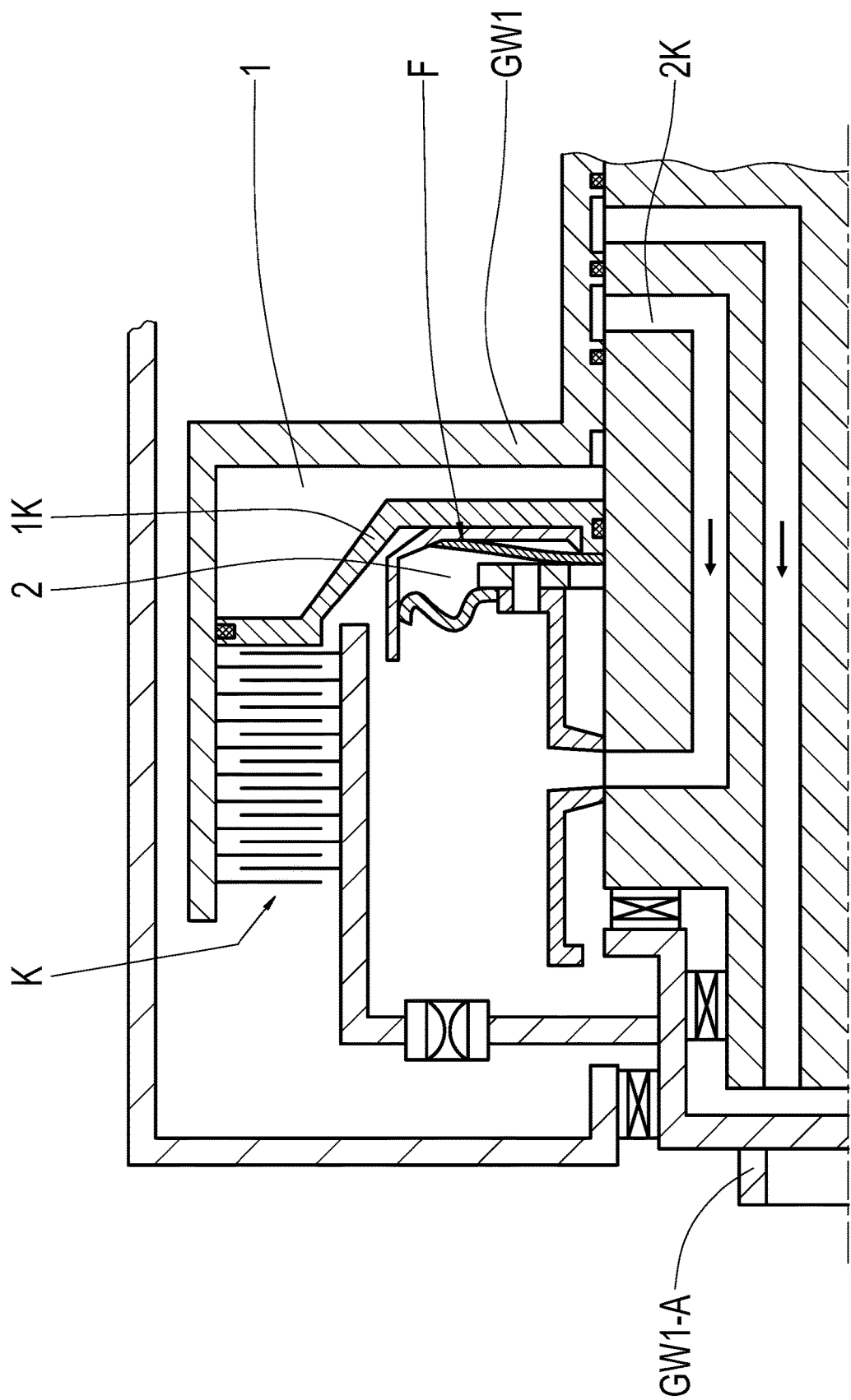
FIG. 2 shows a cutaway view of a shift element in a motor vehicle transmission.

FIG. 2 shows a cutaway view of the clutch K of the motor vehicle transmission G. A piston 1K forms a part of the delimitation of the pressure chamber 1, which can be filled with hydraulic fluid by opening the control valve V1. The piston 1K is preloaded by a spring device F, and therefore, when the pressure chamber 1 has been drained, the clutch K is held in its disengaged position by the spring device F. In this case, the spring device F is arranged between the piston 1K and the pressure compensating cavity 2. The pressure compensating cavity 2 can be filled with hydraulic fluid via the duct 2K. If the pressure compensating cavity 2 is filled with hydraulic fluid, a pressure acts in the disengagement direction of the clutch K when there is a rotational speed of the pressure compensating cavity 2. The pressure compensating cavity 2 is proportioned in such a way that it can counteract or even compensate for a pressure change in the pressure chamber 1, which is induced by the rotational speed of the pressure chamber 1.

Figure 3:
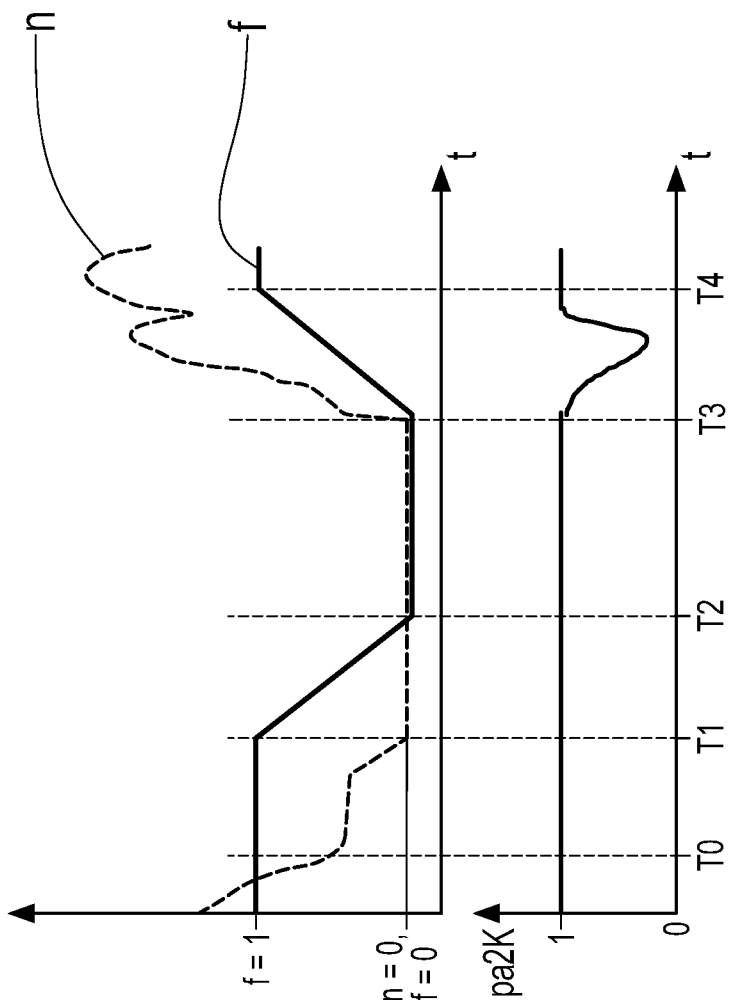

FIG. 3 shows, in the upper part, the curves of the modelled fill level value f of the pressure compensating cavity 2 and the rotational speed n of the input shaft GW1 over the time t. In the lower part, the curve of an offset value pa2k of the specified filling pressure pa2 over the time t is indicated. At the point in time T0, the input shaft GW1 rotates. According to the exemplary embodiment represented in FIG. 2, the pressure compensating cavity 2 has the same rotational speed as the input shaft GW1. The fill level value f of the pressure compensating cavity 2 at the point in time T0 is at the maximum value "one", and therefore the pressure compensating cavity 2 can perform its function without restriction. At the point in time T1, the rotational speed n has dropped to the value "zero"—the input shaft GW1 is at a standstill. Due to the force of gravity, the pressure compensating cavity 2 drains. This draining process is mapped in the fill level model, and therefore the fill level value f is reduced in a linear manner, and the value "zero" is reached at the point in time T2. At the point in time T3, the input shaft rotational speed n increases sharply. Driven by the input shaft GW1, the pump P now delivers hydraulic fluid into the hydraulic system again, and therefore the pressure compensating cavity 2 is filled again. This filling process is mapped in the fill level model, and therefore the fill level value—proceeding from the value "zero"—increases linearly until it reaches the value "one" again, at the point in time T4. Between the points in time T3 and T4, the offset value pa2k of the specified filling pressure pa2 is reduced from the value "one" and is subsequently raised again to the value "one". The specified filling pressure pa2 for filling the pressure chamber 1 is multiplied by the offset value pa2k. If the offset value pa2k is the value "one", the specified filling pressure pa2 does not change. If the offset value pa2k is a value less than one, the specified filling pressure pa2 is correspondingly reduced.

FIG. 4 shows two different curves of the actuating pressure pa for the pressure chamber 1 during an engagement process of the clutch K. The curve represented by a dashed line designates a process having insufficient filling of the pressure compensating cavity 2, and the other curve designates a process having a completely filled pressure compensating cavity 2. In the curve represented by a dashed line, the variables of the specified filling pressure pa2, the actuating pressure pa, and the filling time ts have been appropriately adapted by the correction factors of the fill level model. At the point in time T10, the control valve V1 is actuated in order to fill the pressure chamber 1, and initially releases a high pressure pulse. Subsequent thereto, the actuating pressure pa is reduced to the specified filling pressure pa2 which is held for the duration of the filling time ts up to the point in time T11. Subsequently, the actuating pressure pa is reduced, so that the hydraulic fluid comes to rest in the pressure chamber 1 and the air gap of the clutch K is overcome. At the point in time T12, the actuating pressure pa is increased, and therefore the actual engagement process of the clutch K begins. At the point in time T13, the actuating pressure pa is increased again, whereby the clutch K is transferred into state in which a high amount of pressure is exerted thereon. If the fill state model outputs a correction value due to an insufficiently filled pressure compensating cavity 2, the filling time ts and the specified filling pressure pa2 are reduced. The actuating pressure pa is also appropriately reduced in the further course between the points in time T11 and T12.

Modifications and variations can be made to the embodiments illustrated or described herein without departing from the scope and spirit of the invention as set forth in the appended claims.

REFERENCE CHARACTERS

VKM internal combustion engine
AG axle transmission
DW drive wheel
G vehicle transmission
GW gearshift unit
GW1 input shaft
GW1-A external interface
EM electric machine
S stator
R rotor
P pump
H1 primary circuit
H2 secondary circuit
DR system pressure valve
V1 control valve
1K piston
2K duct
K clutch
1 pressure chamber
2 pressure compensation space
F spring device
f fill level
n input shaft rotational speed
pa actuating pressure
pa2 specified filling pressure
pa2k filling pressure offset
ts filling time

The invention claimed is:

1. A method for controlling a hydraulically actuated shift element of a vehicle transmission (G) having a pressure chamber (1) that is fillable with hydraulic fluid by an electronically controlled hydraulic system in order to actuate the shift element, the method comprising:
determining a fill level of a pressure compensating cavity (2) associated with the pressure chamber (1); and
controlling pressurizing of the pressure chamber (1) with the hydraulic fluid based at least in part on the determined fill level of the pressure compensating cavity (2).

2. The method of claim 1, wherein the fill level of the pressure compensating cavity (2) is determined based at least in part on a rotational speed of a pressure supply unit (P) of the hydraulic system.

3. The method of claim 1, wherein the fill level of the pressure compensating cavity (2) is determined based at least in part on a rotational speed of the pressure compensating cavity (2).

4. The method of claim 3, wherein the fill level of the pressure compensating cavity (2) is determined based at least in part on an elapsed time after the rotational speed of the pressure compensating cavity falls below a rotational speed limit.

5. The method of claim 1, wherein the fill level of the pressure compensating cavity (2) is determined based at least in part on a temperature of the hydraulic fluid.

6. The method of claim 1, wherein the fill level of the pressure compensating cavity (2) is determined based at least in part on a system pressure existing in the hydraulic system of the vehicle transmission (G).

7. The method of claim 1, wherein the fill level of the pressure compensating cavity (2) is determined based at least in part on leakage prevailing in the hydraulic system of the vehicle transmission (G).

8. The method of claim 1, wherein the fill level of the pressure compensating cavity (2) is determined based at least in part on a flow rate of active consumers of the hydraulic system of the vehicle transmission (G).

9. The method of claim 1, wherein the pressurizing of the pressure chamber (1) is controlled based at least in part on a fill level model for the determined fill level of the pressure compensating cavity (2).

10. The method of claim 1, wherein controlling pressurizing of the pressure chamber (1) comprises changing one or more of a plurality of control parameters of the shift element as a function of the determined fill level of the pressure compensating cavity (2), the plurality of control parameters of the shift element comprising an actuating pressure (pa), a filling time (ts), and a specified filling pressure (pa2).

11. The method of claim 10, wherein the actuating pressure (pa) of the shift element is reduced when the pressure compensating cavity (2) is insufficiently filled.

12. The method of claim 10, wherein the specified filling pressure (pa2) of the shift element is reduced when the pressure compensating cavity (2) is insufficiently filled.

13. The method of claim 10, wherein the filling time (ts) of the shift element is reduced when the pressure compensating cavity (2) is insufficiently filled.

14. The method of claim 1, wherein the shift element is a clutch (K), the clutch (K) configured for establishing a torque-transmitting connection between an external interface (GW1-A) of the vehicle transmission (G), to which a transmission-external drive unit is connectable, and an input shaft (GW1) of a gear-forming section (GW) of the vehicle transmission (G).

15. A vehicle transmission (G), comprising a plurality of shift elements, a hydraulic system for actuating at least one of the shift elements, and a control unit (ECU) for controlling the hydraulic system, wherein the control unit (ECU) is configured for implementing the method of claim 1.

* * * * *